US010074972B2

(12) United States Patent
Hartung et al.

(10) Patent No.: US 10,074,972 B2
(45) Date of Patent: Sep. 11, 2018

(54) SYSTEM AND METHOD OF CONTROLLING CURRENT-LIMITERS IN RING SYSTEMS

(71) Applicant: ABB TECHNOLOGY AG, Zurich (CH)

(72) Inventors: Karl-Heinz Hartung, Bad Honnef (DE); Ralf Bockholt, Haan (DE); Volker Grafe, Mulheim (DE)

(73) Assignee: ABB Schweiz AG, Baden (CH)

( * ) Notice: Subject to any disclaimer, the term of this patent is extended or adjusted under 35 U.S.C. 154(b) by 434 days.

(21) Appl. No.: 14/688,328

(22) Filed: Apr. 16, 2015

(65) Prior Publication Data

US 2015/0280427 A1    Oct. 1, 2015

Related U.S. Application Data

(63) Continuation of application No. PCT/EP2013/003080, filed on Oct. 14, 2013.

(30) Foreign Application Priority Data

Oct. 16, 2012   (EP) .................................... 12007164

(51) Int. Cl.
*H02H 9/02*    (2006.01)
*H02H 3/08*    (2006.01)
(Continued)

(52) U.S. Cl.
CPC ............... *H02H 9/02* (2013.01); *H02H 3/08* (2013.01); *H02H 3/083* (2013.01); *H02H 3/44* (2013.01);
(Continued)

(58) Field of Classification Search
CPC .. H02H 3/02; H02H 9/02; H02H 3/08; H02H 3/083; H02H 3/44; H02H 7/042; H02H 7/267; H02H 7/07; H02H 7/28
See application file for complete search history.

(56) References Cited

U.S. PATENT DOCUMENTS 4,053,875 A  * 10/1977 Kupersmit ........... G01R 19/145
                                                    324/72
5,204,654 A  *  4/1993 Hay ....................... H01H 9/102
                                                    337/204
(Continued)

FOREIGN PATENT DOCUMENTS

CN       101640405 A    2/2010
DE         2712470 A1    9/1978
(Continued)

OTHER PUBLICATIONS

International Search Report (PCT/ISA/210) dated Apr. 23, 2014, by the European Patent Office as the International Searching Authority for International Application No. PCT/EP2013/003080.
(Continued)

*Primary Examiner* — Zeev V Kitov
(74) *Attorney, Agent, or Firm* — J. Bruce Schelkopf; Taft Stettinius & Hollister LLP

(57) ABSTRACT

An exemplary electrical network in form of a ring system includes a plurality of infeed transformers which are arranged in parallel between a sourcing busbar/cable system and a ring load busbar/cable system. A junction point connects each infeed transformer to the ring load busbar/cable system. The network includes a plurality of current limiters, where each current limiter is positioned between two junction points. Upon a fault event of an infeed transformer, two current limiters on both sides of a respective junction point of the faulted infeed transformer are simultaneously tripped in order to reduce current in the ring load busbar/cable system.

6 Claims, 1 Drawing Sheet

(51) Int. Cl.
*H02H 3/44* (2006.01)
*H02H 7/04* (2006.01)
*H02H 7/26* (2006.01)
*H02H 7/28* (2006.01)

(52) U.S. Cl.
CPC ............ *H02H 7/042* (2013.01); *H02H 7/267* (2013.01); *H02H 7/28* (2013.01)

(56) References Cited

U.S. PATENT DOCUMENTS

| | | | | | |
|---|---|---|---|---|---|
| 5,402,299 | A | * | 3/1995 | Bellei | ............... H02H 7/30 361/62 |
| 5,808,844 | A | * | 9/1998 | Schiel | ............... H02H 3/283 361/36 |
| 2010/0296207 | A1 | * | 11/2010 | Schumacher | ......... B63H 21/17 361/43 |
| 2012/0267896 | A1 | * | 10/2012 | Cousineau | ............... H02H 7/30 290/55 |
| 2013/0215543 | A1 | | 8/2013 | Hoeven | |

FOREIGN PATENT DOCUMENTS

| | | |
|---|---|---|
| DE | 3642136 A1 | 6/1988 |
| EP | 2442417 A1 | 4/2012 |
| GB | 27312 A | 12/1911 |
| GB | 543684 A | 3/1942 |
| GB | 2198001 A | 6/1988 |

OTHER PUBLICATIONS

Written Opinion (PCT/ISA/237) dated Apr. 23, 2014, by the European Patent Office as the International Searching Authority for International Application No. PCT/EP2013/003080.

Chinese Office Action dated Oct. 28, 2016; Chinese Application No. 201380054283.1; ABB Technology AG; 12 pgs. (including translation).

* cited by examiner

| Fault on: | Limiter A1 | Limiter A2 | Limiter A3 |
|---|---|---|---|
| BB1 | tripped | not tripped | tripped |
| BB2 | tripped | tripped | not tripped |
| BB3 | not tripped | tripped | tripped |

SYSTEM AND METHOD OF CONTROLLING CURRENT-LIMITERS IN RING SYSTEMS

RELATED APPLICATION(S)

This application claims priority under 35 U.S.C. § 120 to International application PCT/EP2013/003080 filed on Oct. 14, 2013, designating the U.S., and claiming priority to European application 12007164.2 filed on Oct. 16, 2012. The content of each prior application is hereby incorporated by reference in its entirety.

FIELD

The present disclosure relates to an electrical network in the form of a ring system, such as a ring system having several infeed transformers which are parallel arranged one to another between a sourcing busbar/cable system and a ring load busbar/cable system.

BACKGROUND INFORMATION

The subject matter of the present disclosure is relevant to electrical utility networks, industrial networks and private networks. Upon the occurrence of a single-phase, double-phase or three-phase fault, the voltage will drop for a minimum four half cycles in the complete system as the protection system in cooperation with the switching device calls for these time periods to switch off the current. This voltage drop can cause reliability problems for voltage sensitive devices and systems, which are connected to such an electrical network, for example electrical devices in hospitals.

SUMMARY

An exemplary electrical network arranged as a ring system is disclosed, comprising: a plurality of infeed transformers which are arranged in parallel between a sourcing busbar/cable system and a ring load busbar/cable system; a junction point connecting each infeed transformer to the ring load busbar/cable system; and a plurality of current limiters, wherein each current limiter is positioned between two junction points, wherein, upon a fault event of an infeed transformer, two current limiters on both sides of a respective junction point of the faulted infeed transformer are simultaneously tripped in order to reduce current in the ring load busbar/cable system.

An exemplary method of reducing current in an electrical network arranged as a ring system is disclosed, the network having a plurality of infeed transformers which are arranged in parallel between a sourcing busbar/cable system and a ring load busbar/cable system, a junction point connecting each infeed transformer to the ring load busbar/cable system via a junction point, and a plurality of current limiters, wherein each current limiter is positioned between two junction points, the method comprising: simultaneously tripping two current limiters on both sides of a respective junction point upon a fault event of a corresponding infeed transformer to reduce current in the ring load busbar/cable system.

BRIEF DESCRIPTION OF THE DRAWINGS

The forgoing and other aspects of the disclosure will become apparent following the detailed description of the disclosure, when considering in conjunction with the enclosed drawings in which.

DETAILED DESCRIPTION

Figures 1, 2:
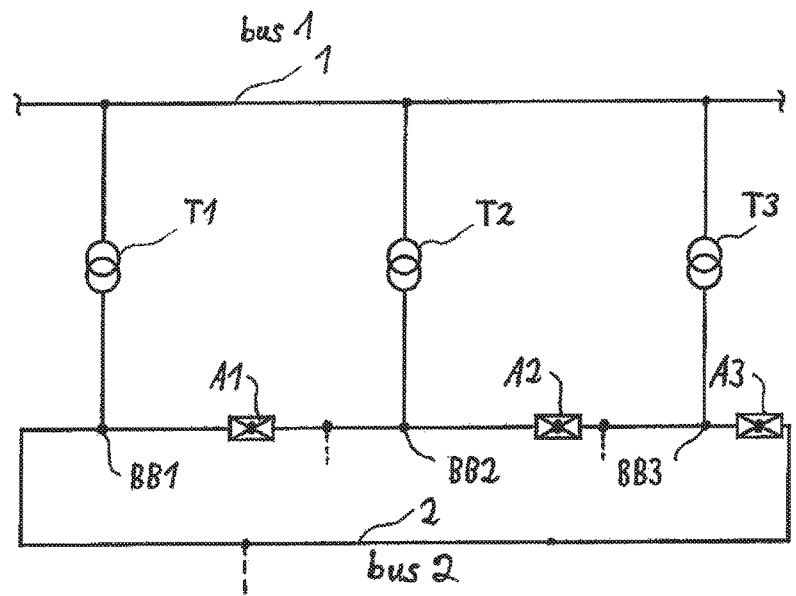
FIG. 1 shows a circuit diagram of an electrical network in the form of a ring system according to an exemplary embodiment of the disclosure.
FIG. 2 shows a table of the switching states of the current limiters integrated in the ring system as shown in FIG. 1 and according to an exemplary embodiment of the disclosure.

An exemplary electrical network according to the present disclosure is provided in the form of a ring system that includes multiple infeed transformers, wherein the ring load busbar/cable system has several current limiters which are arranged to both sides of junction points of each infeed transformer to the ring load busbar/cable system in order to reduce current in the ring load busbar/cable system in a fault event.

Exemplary embodiments of the present disclosure provide an electrical network in the form of ring system in which the time period for voltage drops in a fault event is limited by electrical means (e.g., circuit, device).

According to another exemplary embodiment of the present disclosure the two current limiters to both sides of the junction point of the faulted infeed transformer are simultaneously tripped in order to reduce the current in the ring load busbar/cable system in fault event.

Due to this special solution the time period of voltage drop in the parts of the electrical network, which do not contain the fault area directly, can be limited to one half cycle and less.

The at least two current limiters which are associated with at least one infeed transformer are provided with special tripping criteria, wherein the instantaneous current of the summation current of one of the different protection zones defined by the current limiters is logically AND combined with the rate of rise of the same summation current.

The summation currents are considered in such a way, that the reaction time of the further processing is reduced to minimum.

These special tripping criteria for operating current limiters in a ring system are faster than any other electrical devices and systems, and faster than known protection relays in combination with circuit-breakers. The solution according to the disclosure provides a safer electrical supply for voltage sensitive devices and systems and it additionally reduces the arc energy and therefore the impacts in case of arc faults.

FIG. 1 shows a circuit diagram of an electrical network in the form of a ring system according to an exemplary embodiment of the disclosure. The electrical network as shown in FIG. 1 includes three infeed transformers T1, T2, and T3 in order to provide the power supply. The said three infeed transformers T1, T2, and T3 are parallel arranged between a sourcing busbar/cable system (1) and a ring load busbar/cable system (2) on the load side of the electrical network.

The ring load busbar/cable system (2) includes several current limiters A1, A2, and A3 arranged to both sides of junction points BB1, BB2, and BB3, of each infeed transformer T1, T2, or T3 respectively. The said junction points BB1, BB2, and BB3 connect the outgoing line of each infeed transformer T1, T2, and T3 to the ring load busbar/cable system (2). The three current limiters A1, A2, and A3 of the ring load busbar/cable system (2) reduce the current in the ring load busbar/cable system (2) in fault event according to specific tripping criteria as shown in table of FIG. 2.

The first infeed transformers T1 correspond to the two current limiters A1 and A3 which are arranged to both sides of the junction point BB1. The second transformers T2 correspond to the two current limiters A2 and A1 which are arranged to both sides of the junction point BB2. The third infeed transformer T3 corresponds to the two current limiters A3 and A2 which are arranged on both sides of the corresponding junction point BB3.

Each two current limiters A1, A3; A2, A1; A3, A1 of the corresponding infeed transformer T1 to T3 are simultaneously tripped in order to reduce the current in the ring load busbar/cable system in fault event.

FIG. 2 shows a table of the switching states of the current limiters integrated in the ring system as shown in FIG. 1 and according to an exemplary embodiment of the disclosure. In view of FIG. 2 the current limiters A1 and A3 will be tripped if a fault occurs between the elements transformer T1, current limiter A1 and current limiter A3 (including junction point BB1). The current limiters A1 and A2 will be tripped if a fault occurs between the elements transformer T2, current limiter A1 and current limiter A2 (including junction point BB2). Finally, the current limiters A2 and A3 will be tripped if a fault occurs between the elements transformer T3, current limiter A2 and current limiter A3 (including junction point BB3).

The disclosure is not limited by the embodiment as descript above which is presented as an example only. It can be modified in various ways within the scope of protection defined by the patent claims. Specially, more or less than three infeed transformers can be integrated in a ring load busbar/cable system.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS 1 sourcing busbar/cable system
2 ring load busbar/cable system
T1 . . . Tn infeed transformers
BB1 . . . BBn junction points
A1 . . . An current limiters

What is claimed is:

1. An electrical network arranged as a ring system, comprising:
    a plurality of infeed transformers which are arranged in parallel between a sourcing busbar/cable system and a ring load busbar/cable system;
    a junction point connecting each infeed transformer to the ring load busbar/cable system; and
    a plurality of current limiters, wherein each current limiter is positioned between two junction points,
    wherein, upon a fault event of a faulted infeed transformer, two current limiters on both sides of a respective junction point of the faulted infeed transformer are simultaneously tripped in one half cycle or less in order to reduce current in the ring load busbar/cable system.

2. The electrical network according to claim 1, wherein the two current limiters on both sides of the respective junction point establish a respective protection zone, and an instantaneous current of a summation current of the respective protection zones defined by the current limiters is logically AND-combined with a rate of rise of the summation current of the respective protection zones.

3. The electrical network according to claim 1, wherein the plurality of infeed transformers are arranged in parallel between the sourcing busbar/cable system and the ring load busbar/cable system, and wherein the ring load busbar/cable system includes three current limiters, each current limiter being positioned two junction points, and wherein current limiters on both sides of a respective junction point of a corresponding infeed transformer form a current limiter pair.

4. The electrical network according to claim 1, wherein summation currents are evaluated to reduce a reaction time of further processing.

5. A method of reducing current in an electrical network arranged as a ring system, the network having a plurality of infeed transformers which are arranged in parallel between a sourcing busbar/cable system and a ring load busbar/cable system, a junction point connecting each infeed transformer to the ring load busbar/cable system via a junction point, and a plurality of current limiters, wherein each current limiter is positioned between two junction points, the method comprising:
    simultaneously tripping two current limiters on both sides of a respective junction point in one half cycle or less upon a fault event of a corresponding faulted infeed transformer to reduce current in the ring load busbar/cable system.

6. The method according to claim 5, wherein the two current limiters on both sides of the respective junction point establish a respective protection zone, the method comprising:
    combining an instantaneous current of a summation current of the respective protection zones defined by the current limiters with a rate of rise of the summation current of the respective protection zones through a logical AND operation.

* * * * *